UNITED STATES PATENT OFFICE 2,622,090

METHOD OF NEUTRALIZING SULPHONIC PRODUCTS

Gunnar Olof Sundien, Copenhagen, Denmark

No Drawing. Application July 27, 1948, Serial No. 40,995. In Denmark July 28, 1947

10 Claims. (Cl. 269—400)

The invention relates to a method of neutralizing sulfonated and sulphated oils.

It is known to neutralize products consisting either of pure sulphonic acids containing the group —$SO_2OH$, or acid sulphates with the group —$OSO_2OH$, or these substances with excess of a sulphonic agent, by applying the sulphonic products to a concentrated alkaline solution, for instance a solution of sodium hydroxide, during agitation and cooling.

This method though in many instances satisfactory, has been found to fail entirely when neutralizing various easily decomposable sulphonic acids and acid sulphates, particularly those which in their neutralized condition are employed as capillary active substances, moistening agents, emulsifiers, washing means, etc., such as higher acid alkyl aryl sulphates of the formula R—$OSO_2OH$, and sulphonated monoglycerides of the formula $$RCOOCH_2CHOHCH_2\text{---}OSO_2OH$$

in both instances of which R indicates a saturated or unsaturated alkyl with preferably at least 9 carbon atoms.

The disadvantages in connection with the above described methods of neutralization are partly the considerable dissolving heat of the sulphuric acid in water, and partly the varying pH-adjustment, as during mixture highly acid or alkaline local solutions occur. Sulphonated monoglycerides will for instance to a great extent be partly hydrolyzed—in local acid solution—to monoglycerides and sulpheric acid, or possibly free carboxylic acids are formed, and is partly saponified in local alkaline solutions—to carboxylic acids salts and glycerine and sodium sulphate. These injurious reactions are to a considerable extent favoured by the somewhat high temperature that arised—at any rate locally—on account of the mixing heat between water and sulpheric acid.

Furthermore, the dosing incurs difficulties because the sulfonating agent employed, rarely has a well defined concentration, for which reason the pH-value in the finally neutralized solution may vary considerably even if the same quantity of neutralization agent has been used.

Endeavours have been made to improve the conditions of neutralization by simultaneously adding equivalent quantities of the sodium hydroxide solution and the sulphonating products to form a considerable quantity of finally neutralized product during agitation. This method has not solved the problem, because the pH-adjustment is still difficult on account of the dosing difficulties.

The same disadvantages occur in the neutralization by aqueous solutions of other alkaline liquids, for instance potassium hydroxide solution, aqueous ammonia, sodium carbonate solution, etc. In case a sodium carbonate solution is employed considerable difficulties arise in skimming on account of the development of carbon dioxide.

In connection with a sulphonating method it has been proposed to carry out a continuous neutralization with an aqueous sodium hydroxide solution by means of a specially constructed atomizing drier plant in such a manner that the sulphonic products and the sodium hydroxide solution are conveyed to a specially formed rotatable disc or plate where a mixture and a neutralization takes place, whereupon the finally neutralized solution is converted in the form of a fine spray which in the drier chamber is dried into a powder. Apparently this is a simplification of the method, but actually the difficulties have not been removed. Local highly acid or alkaline aqueous solutions will still appear whereby undesired side reactions may take place. An exact regulation of temperature during the neutralization is very difficult to obtain, and the atomizing drying that takes place after conversion into a fine spray still requires the usual heat consumption before the final product is obtained as a dry powder.

All these disadvantages are eliminated by contacting and reacting in conformity with the present invention, the finely divided or atomized sulphonic products with a vaporized neutralizing agent.

By means of this method it is possible to eliminate all injurious side reactions and thus produce a product of the highest quality. Neutralization of the atomized sulphonic products takes place almost momentarily when the size of the particles is maintained below a certain value, preferably below 200 $\mu$, for instance 20–50 $\mu$, i. e. a size of particle approximately of the same order as employed in the atomizing drying of solutions. The gaseous phase in which the reaction takes place will act as a heat absorbing medium. This gaseous phase may exclusively consist of the vaporous neutralizing agent; it may also be a mixture of the vaporous neutralizing agent with an inactive gas, the neutralizing agent being present in at least an amount equalizing the amount of sulphonic products or in excess of the latter.

If no inactive gas is added, the neutralizing agent itself forms the heat absorbing medium and must, therefore, be supplied at a great excess compared with the supplied amount of the sulphonic product.

It is possible to vary the reaction within wide limits by a change of the size of atomized particles of the sulphonic products or by changing the concentration of the neutralizing vaporous agent.

The reaction heat may, for instance, be removed by circulating the amount of the gas forming the gaseous phase and cooling the same during circulation.

It is also possible to remove some of the neutralization heat by applying the neutralizing agent in the form of fine drops or in a condensed state and simultaneously causing the same to be converted in the vaporous or gaseous state to hereafter react with the atomized sulphonic products.

Other advantages obtained by the present invention exist that the neutralization process directly results in the obtaining of a dry powder which may be used in this form, whereas the above known processes of neutralization result in the formation of a solution, and consequently the neutralization process must be followed, or combined, with a drying process and at times with a desalting process if it is desired to isolate the neutralization products.

For carrying out the invention a crude sulphonate is produced in a known manner and employed for neutralization unless in exceptional cases it is desired to isolate the pure sulphonic acid or the acid sulphate prior to neutralization. If for instance fuming sulphuric acid is employed for sulphonating purposes, a homogeneous liquid is produced containing an excess of sulphuric acid. This liquid is often somewhat viscous, but it may easily be atomized by known methods, for instance by means of pressure air through a nozzle, or by means of rapidly rotating discs of various forms.

The method according to the invention will be further explained in the following with reference to some examples.

*Example 1*

222 parts by weight of refined coconut oil (saponification number 260) is mixed with 67 parts by weight of glycerine, and is sulphonated with 540 parts by weight of oleum with 13% $SO_3$. The liquid thus produced is homogeneous and has a consistency which is almost equal a fat oil.

For neutralizing purposes there is employed an atomizing drier plant, for instance of the Krause system or the Niro system, which are completely closed and provided with a cooler, so that the gas in the drying chamber can be drawn out of the chamber, pass through the cooler and be blown back into the chamber. Within the chamber a mixture is maintained of equal quantities by weight of gaseous ammonium and atmospheric air while simultaneously the mixture is circulated through the plant at a speed of 2400 kilos per hour.

The sulphonic product is now applied at a speed of 83 kilos per hour and is atomized by means of a disc rotating at a speed of for instance 14,000 revolutions per minute, while at the same time at any desired point an equivalent amount of ammonia is conveyed into the plant. The supply of ammonia, which is about 17 kilograms per hour, is regulated for instance by means of the pressure within the chamber.

During the above described conditions of operation the temperature within the zone of reaction increases for 25 to 30° C. The output is about 100 kilograms of dry powder per hour. The powder is completely white and is fully soluble in hard water, for instance in water from water works, and in brine. A 0.5% aqueous solution has a pH-value of 5.5 to 6.0, which is substantially equal to that of a solution of chemically pure ammonium sulphate.

As the treating vessel is completely closed the consumption of the neutralization agent is practically 100 per cent of the theoretical value, because the neutralization agent not utilized in the reaction is continuously circulated through the plant.

*Example 2*

In a plant as described in connection with Example 1, a similar quantity of a sulphonic product is treated in such a manner that the ammonia is expanded into the chamber from a container charged with liquid ammonia, from which container a pipe leads to an expansion valve that is controlled in conformity with the ammonia concentration within the chamber, and from which the pressure is reduced from 7 to 1 atm. From the expansion valve the ammonia is delivered to a heat exchange device through which the circulating mixture of air and ammonia likewise passes to cool it; from the heat exchange device the ammonia enters the reaction zone.

*Example 3*

The sulphonic product is neutralized in the atomizing drier plant in the same manner as described in Example 1, but in this instance with piperidine as neutralization agent.

Piperidine is supplied in liquid form into a scrubber in series with the cooler mentioned in connection with Example 1, and is distributed on a filler of the scrubber from which the piperidine gradually evaporates and is absorbed by the air or gas circulating through the plant and at the same time cools this air or gas.

In this method the temperature at the outlet of the atomizing drier plant may be about 50° C. A slight cooling takes place to about 40° C., until the mixture of air and neutralization agent enters the scrubber, in which the mixture is cooled to about 20° C. at which temperature it again enters the plant.

The method is particularly intended for the production of such sulphonic products which in their neutralized state are employed as capillary active substances, washing means, emulsifiers, etc.

I claim:

1. In a method of neutralizing a substance selected from a group consisting of sulphonated and sulphated fatty glyceride oils with alkali, comprising, using said substance in the atomized state and the alkali in the vaporous state, the size of the atomized particles being controlled to be below two-hundred microns.

2. In a method of neutralizing a substance selected from a group consisting of sulphonated and sulphated fatty glyceride oils with alkali, comprising, using said substance in the atomized state and the alkali in the vaporous state, the alkali being added in excess over the amount required for the neutralization.

3. In a method of neutralizing a substance selected from a group consisting of sulphonated and sulphated fatty glyceride oils with alkali, comprising, using said substance in the atomized state and the alkali in the vaporous state while adding a neutral gas to the alkali vapor.

4. In a method of neutralizing a substance selected from a group consisting of sulphonated and sulphated fatty glyceride oils with alkali, comprising, using said substance in the atomized state and the alkali in the vaporous state while adding air to the alkali vapor.

5. In a method of neutralizing a substance selected from a group consisting of sulphonated and sulphated fatty glyceride oils with alkali, comprising, using said substance in the atomized state and the alkali in the vaporous state while maintaining the mixture of the said substance and of the said vapor in a closed continuous circulation.

6. In a method of neutralizing a substance selected from a group consisting of sulphonated and sulphated fatty glyceride oils with alkali, the steps comprising, atomizing said substance, and conducting the same into a gaseous phase containing the alkali in the vaporous state.

7. In a method according to claim 6, and selecting the alkali from a group consisting of gaseous ammonia, vaporous piperidine, and vaporous pyridine.

8. In a method according to claim 6, and circulating the gaseous phase and cooling the same during circulation.

9. In a method of neutralizing a substance selected from a group consisting of sulphonated and sulphated fatty glyceride oils with alkali, atomizing said substance to form a gaseous phase, into which the alkali is evaporated.

10. In a method of neutralizing a substance selected from a group consisting of sulphonated and sulphated fatty glyceride oils with alkali, the step of atomizing said substance into a gaseous phase, into which the alkali is expanded.

GUNNAR OLOF SUNDIEN.

REFERENCES CITED

The following references are of record in the file of this patent:

UNITED STATES PATENTS

| Number | Name | Date |
|---|---|---|
| 736,007 | Perrelet | Aug. 11, 1903 |
| 2,341,536 | Fash | Feb. 15, 1944 |

FOREIGN PATENTS

| Number | Country | Date |
|---|---|---|
| 692,862 | France | Nov. 12, 1930 |
| 701,187 | France | Mar. 12, 1931 |